Oct. 30, 1962 G. BROLLO 3,060,944
DISH-WASHING MACHINE
Filed Aug. 9, 1960 2 Sheets-Sheet 1

INVENTOR
GIUSEPPE BROLLO
BY
ATTORNEY.

Oct. 30, 1962           G. BROLLO           3,060,944

DISH-WASHING MACHINE

Filed Aug. 9, 1960           2 Sheets-Sheet 2

INVENTOR
GIUSEPPE BROLLO
BY

ATTORNEY.

United States Patent Office
3,060,944
Patented Oct. 30, 1962

3,060,944
DISH-WASHING MACHINE
Giuseppe Brollo, V. le Fulvio Testi 49, Milan, Italy
Filed Aug. 9, 1960, Ser. No. 48,501
Claims priority, application Italy Apr. 14, 1960
4 Claims. (Cl. 134—58)

The present invention relates to a dish-washing machine in general and to such a machine having rotary baskets for the dishes and other utensils in particular.

Machines for washing dishes and utensils, which are known, are very complicated in their operation and require, among other things, constant personal supervision until their work is completed. This is a serious drawback, since the housewife has to watch the washing machine and cannot attend to other domestic tasks in the meantime.

It is one object of the present invention to provide a machine, of simplified design, for washing dishes and utensils which does not require constant operational supervision.

It is another object of the present invention to provide a washing machine which comprises substantially a chamber for washing and rinsing dishes and utensils arranged in rotary baskets, hot or cold water jets emerging from fixed or adjustable ejector nozzles which are arranged inside the chamber and suitably inclined in a vertical or horizontal plane. A small tank for containing the washing water which is to be heated with appropriate thermoelectric elements is also provided. Further a pump is arranged for feeding hot water from the small tank into the chamber. A special tube with two inverse check valves or stop cocks, operating automatically by means of the water pressure, is capable of performing a closed cycle of washing with hot water, to which suitably any type of detergent has been added, and of rinsing the dishes or utensils with fresh water taken from a conventional water supply pipe. A control unit is provided, which includes a rotary cam and is designed to switch off and on, respectively, in predetermined sequences the respective circuits including thermoelectric resistances for heating the water in the small tank, including those of the motor driving the hot water pump, as well as the circuits of an electrically controlled stop cock which is appropriately disposed in the cold water pipe and also a switch controlling the electric motor actuating the mentioned cam, during the entire washing cycle.

With this and other objects in view which will become apparent in the following detailed description, the present invention will be clearly understood in connection with the accompanying drawings, in which.

Figure 1:
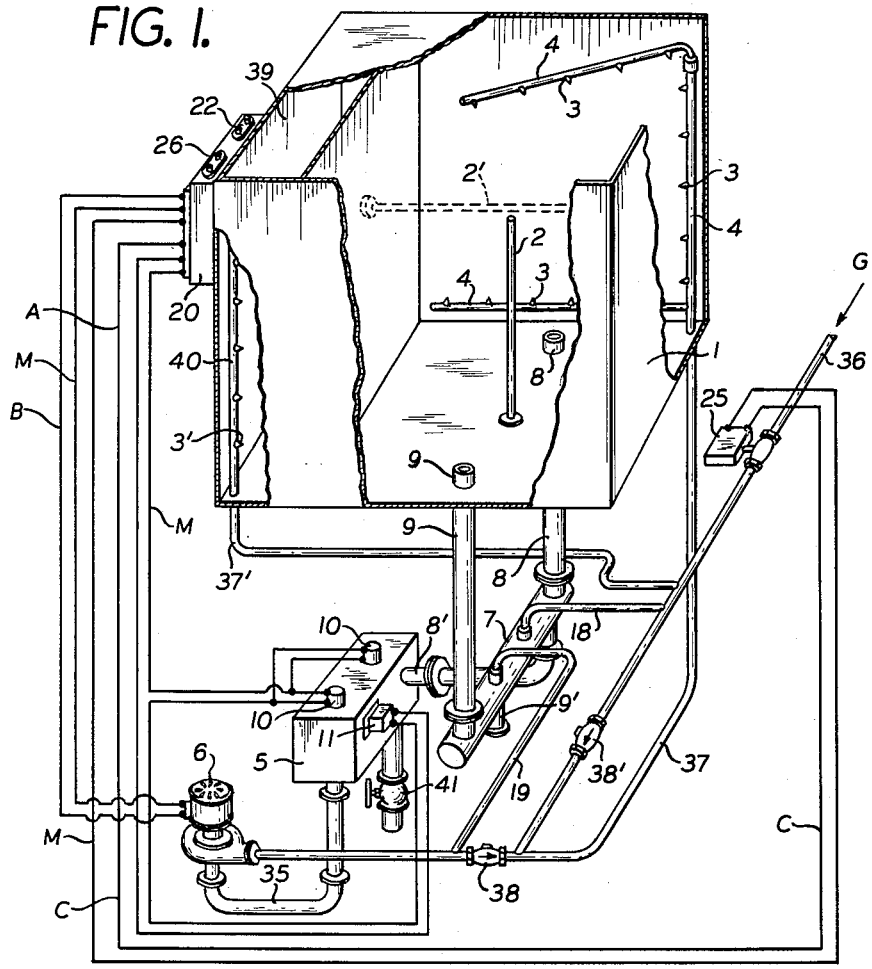
FIGURE 1 is a side perspective view of the washing machine according to the present invention, the baskets for the dishes and utensils being removed.
Figure 2:
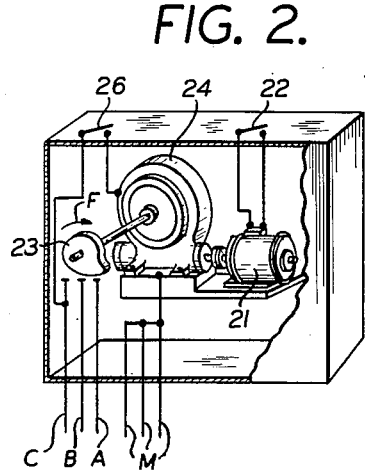
FIG. 2 is a schematic perspective view of the details of the electric cam control placed outside the washing machine.

Referring now to the drawings, the washing machine comprises a washing and rinsing chamber 1 for the dishes and utensils placed in baskets. The latter rotate freely on a vertical pivot rod 2 or on a horizontal pivot rod 2', these rods 2 and 2' being permanently secured in the chamber 1.

A plurality of fixed or adjustable water spraying nozzles are disposed in the chamber 1 horizontally, vertically or inclined, which nozzles are suitably located along tubes 4 feeding water into the chamber for washing or rinsing.

A small tank 5 for heating the washing water is preferably disposed below the chamber 1 and also the corresponding pump 6 for feeding heated water into the chamber 1 and a tube 7 with two inverse check valves, the conduits 8, 8' for the return of the heated water, and the conduits 9, 9' for the discharge of the rinsing water.

Figure 3:
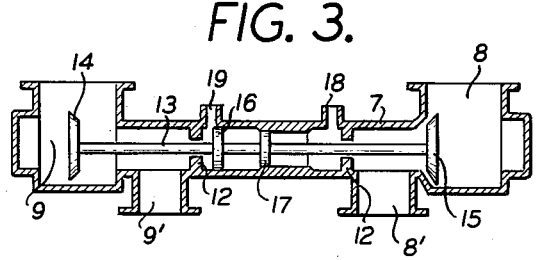
FIG. 3 is an axial section of a tube with two inverse stop cocks.

The rinsing water is heated in the tank 5 by means of thermoelectric resistances 10 which are controlled by a thermostat 11 appropriately inserted in the circuit of the resistances 10. The tube 7 which includes two inverse check valves comprises a tubular body (FIG. 3) and a shaft 13 supports at its ends the closing caps 14 and 15 and intermediate its ends the pistons 16 and 17, the caps and the pistons being integral with the shaft, so as to close the pipes 9, 9' for the discharge of the rinsing water, upon moving the shaft 13 axially towards the left or towards the right (FIG. 3), by means of the pressure of the water in the pipes 18 and 19, respectively.

In order to secure the proper operation, the pistons 16 and 17 have different diameters, and the inner bores of the portions of the tube 7 receiving the pistons 16 and 17, respectively, are arranged complementary to the diameters of said pistons. The control means for the electric drive for the washing machine is arranged laterally to the chamber 1 or in any other suitable position, for example, inside of a box 20. The drive comprises an electric motor 21 with a control switch 22 and a cam 23 driven by the motor 21 over a mechanical reduction gear 24. During rotation in the direction of the arrow F, the cam 23 shuts off the electric circuits A, B, C progressively and automatically, which circuits include a return wire M, the resistances 10, the pump 6 and an electric operated cock 25 located at the feeding end of the water source pipe 36.

A switch 26 is arranged in the electric circuit, which switch 26 is manually operated if it is desirable to preheat the water in the tank 5.

The baskets for holding the dishes comprise substantially a hollow shaft 27 which may be mounted freely rotatable on the pivot rods 2, 2', respectively, and one or more racks receiving the dishes are secured to the hollow shaft in such a position as to cause the basket or baskets to rotate upon the pivot rods 2, 2', when the washing or rinsing water strikes the dishes due to the inclined position of the nozzles 3.

Figure 4:
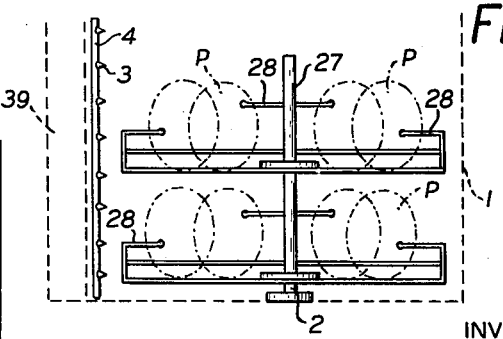
FIG. 4 is an axial section of the basket for holding dishes with a plurality of ejector nozzles disposed within the washing and rinsing chamber, indicated in broken lines.

According to one embodiment of the baskets, the rack receiving the dishes P comprises horizontal bars 28 arranged at various vertical levels (FIG. 4), while in accordance with another embodiment a plurality of pliable arms 29, which are bent obliquely, grips, by means of prongs 30 provided on the end and intermediate portions of the arms 29, the edges of the dishes. The arms 29 are suitably arranged radially, as shown in FIGS. 5 and 6, and are formed to cylindrical cages having vertical bars 30'.

Figure 5:
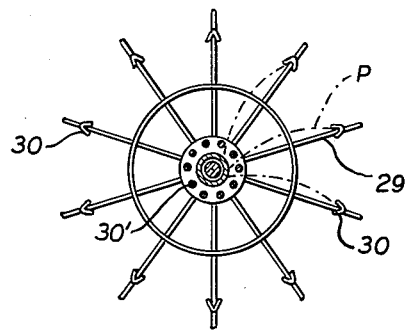
FIGS. 5, 6, 7 and 8 disclose axial sections and top plan views, respectively, of other embodiments of dish baskets.
Figure 6:
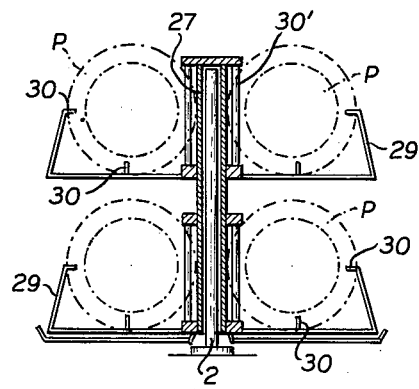
Figure 7:
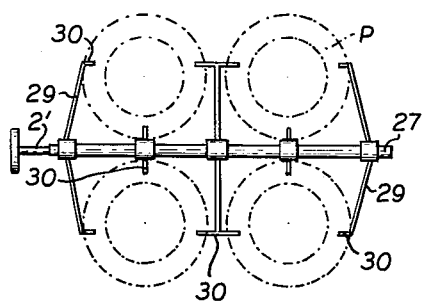
Figure 8:
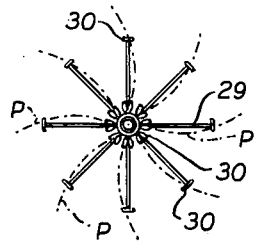

FIGS. 7 and 8 disclose an embodiment wherein a basket with a rack holding the dishes is provided, similar to the embodiment disclosed in FIGS. 5 and 6, but with a horizontally disposed shaft, to be mounted on the horizontal shaft 2' of the chamber 1 (FIG. 1).

After having arranged the baskets receiving the dishes to be washed in the chamber 1 and after having shut off the switch 26 for preliminary heating of the water in the tank 5, the operator turns on the control switch 22, thus starting the operation of the cam 23.

The cam 23, upon reaching the corresponding position, starts the motion of the pump 6 which now feeds hot water from the tank 5 through the pipe 35 to the chamber by means of the nozzles 3 and simultaneously through the conduit 19 into the tube 7 having the double cocks, thus causing a displacement of the shaft 13 towards the right and effecting the closing of the discharge pipes 9, 9' by means of the cap 14. During this phase of the operation, the used water returns into the tank 5 through the pipes 8, 8', so as to be fed again into the chamber 1 in a continuous cycle, as long as the cam 23 does not, during its rotation, cause the shutting off of the circuit C supplying current to the electrically operated cock 25, through which the water is fed from the water source pipe 36 in the direction of the arrow G, to pass through the pipes 37 and 37'. By this arrangement the rinsing of the dishes through the nozzles 3 is brought about. In this phase of the operation the water, fed from the cold water source pipe 36, cannot pass into the pump 6, in view of the unidirectional stop valve 38 provided in the pipe 37, while the rinsing water running through the pipe 18 causes a displacement of the shaft 13 of the tube 7, towards the left, thus causing a closing of the pipes 8, 8' for the return of the hot water and at the same time the opening of the discharge pipes for removing the water from the chamber 1.

The return of the cam 23 to its original position causes the opening of the circuit supplying current to the motor 21 and thus the stopping of the machine, without requiring any manual control.

A second chamber 39, disposed laterally to the chamber 1, to which chamber 39 water is supplied by the pipe 40 by means of additional nozzles 3', provides, if necessary, a second dish rinsing with cold or pre-heated water, which is heated by means of suitable electric resistances (not shown) inserted in the chamber 39.

After each operation, the used dish washing water, is removed by manual operation of the discharge valve 41 disposed below the tank 5 which discharge valve 41 can also be operated automatically by the cam 23. A filling valve for the tank 5 and other supplementary devices (not shown) can likewise be operated by the cam 23 in a complete cycle for washing and rinsing of the dishes and the utensils, including feeding of water and removing the used water.

While I have disclosed several embodiments of the present invention, it is to be understood that these embodiments are given by example only and not in a limiting sense, the scope of the present invention being determined by the objects and the claims.

I claim:
1. A washing machine for dishes and utensils operating automatically in a closed washing cycle, comprising a chamber, a wash water conduit and a rinse water conduit disposed in said chamber and a plurality of ejection nozzles spaced apart axially on each of said conduits for feeding into said chamber hot washing water and cold rinsing water, respectively, a water tank disposed adjacent said chamber and electrical means for heating the water in said water tank, a pump having its inlet side communicating with said tank, the pressure side of said pump communicating with said wash water conduit for feeding heated water from said tank to said one of said conduits and, thereby, towards said ejection nozzles and into said chamber, a tube having an inverse stop valve at each end thereof, a shaft axially movable in said tube and carrying a cap at each of its ends, one of said stop valves being closed by one of said caps upon opening the other of said stop valves, said one of said stop valves being disposed in said wash water conduit between said tank and said chamber, the latter including said pump, and controlling by hydraulic pressure the flow of hot water into said chamber and the other of said stop valves being disposed in said rinse water conduit and controlling the flow of cold rinsing water into said chamber, an electric motor, a rotary cam operatively connected with said electric motor, electrical timer means operated by said rotary cam for controlling said stop valves, the latter controlling the water flow to provide a hot water circulation wash cycle and a fresh cold water rinse cycle, a cold water supply pipe, a stop cock disposed in said cold water supply pipe, and a rod rigidly secured in said chamber, at least one basket secured to a hollow shaft receiving said rod and mounted on the latter, said basket being adapted to receive dishes to be cleaned, and said nozzles being directed towards said dishes so that upon feeding hot and cold water, respectively, to said nozzles said baskets rotate upon said rod.

2. The washing machine, as set forth in claim 1, wherein two pistons are mounted on said shaft intermediate its ends and axially movable with said shaft in said tube, said pistons having different outer diameters and said tube having bores of different inner diameter complementary to the diameter of said pistons, and said inverse stop valves being operated hydraulically by means of said pistons to render operative one of said inverse stop valves at one time.

3. The washing machine, as set forth in claim 1, wherein said basket comprises a rack having horizontal bars disposed parallel to each other at different vertical levels, and said bars having gripping projections adapted to grip said dishes and to hold said dishes between pairs of said bars.

4. The washing machine, as set forth in claim 1, wherein said basket comprises a rack holding the dishes and a plurality of pliable arms bent obliquely and prongs on each of said arms clamp said dishes on said arms, said arms being disposed radially from said hollow shaft to assume a star formation, and said basket including cylindrical cages disposed coaxially with said hollow shaft and comprising a plurality of concentrically disposed vertical bars.

References Cited in the file of this patent

UNITED STATES PATENTS

| | | |
|---|---|---|
| 2,235,196 | Bilde | Mar., 18, 1941 |
| 2,304,438 | Bilde | Dec. 8, 1942 |
| 2,575,493 | Hilliker | Nov. 20, 1951 |

FOREIGN PATENTS

| | | |
|---|---|---|
| 507,677 | Germany | Sept. 19, 1930 |